(12) United States Patent
Abbey (10) Patent No.: US 10,081,097 B1
(45) Date of Patent: Sep. 25, 2018

(54) TOOL FOR PLACEMENT OF CARGO STRAPS AND EDGE PROTECTORS

(71) Applicant: John Abbey, Jenks, OK (US)

(72) Inventor: John Abbey, Jenks, OK (US)

(*) Notice: Subject to any disclaimer, the term of this patent is extended or adjusted under 35 U.S.C. 154(b) by 0 days.

(21) Appl. No.: 15/872,045

(22) Filed: Jan. 16, 2018

(51) Int. Cl.
*B25J 1/04* (2006.01)

(52) U.S. Cl.
CPC ..................... *B25J 1/04* (2013.01)

(58) Field of Classification Search
CPC .................... B25J 1/04; B25J 1/102
USPC ............................ 294/24, 26, 210
See application file for complete search history.

(56) References Cited

U.S. PATENT DOCUMENTS

| | | | |
|---|---|---|---|
| 986,771 A | 3/1911 | Siegel | |
| 3,150,460 A * | 9/1964 | Dees ..................... | A01K 97/00 294/210 |
| 3,469,878 A * | 9/1969 | De Haan ................ | B60P 3/41 294/210 |
| 3,936,088 A | 2/1976 | Williams | |
| 4,260,186 A * | 4/1981 | Sky-Eagle, Jr. ........ | A47L 13/46 294/104 |
| 4,953,905 A * | 9/1990 | Cohen ..................... | B25J 1/00 116/173 |
| 5,201,559 A * | 4/1993 | Boring ................... | B25B 27/04 294/210 |
| D342,196 S * | 12/1993 | Lopack ................... | D32/44 |
| 5,454,611 A | 10/1995 | Wanat | |
| 5,487,576 A * | 1/1996 | DuVivier ................ | B25B 9/00 294/210 |
| 5,558,377 A * | 9/1996 | Blum ...................... | B25J 1/00 294/210 |
| 5,628,538 A * | 5/1997 | Ericksen ................ | A01K 97/24 294/210 |
| 5,771,535 A * | 6/1998 | Blessing ................ | B25G 1/06 15/144.1 |
| 5,823,590 A | 10/1998 | Forrest | |
| 5,967,575 A | 10/1999 | Blake | |
| 6,048,073 A * | 4/2000 | Shiao ..................... | B25G 1/043 294/210 |
| 6,450,557 B1 * | 9/2002 | Martinez ................ | A47F 13/06 294/210 |
| 6,820,906 B1 * | 11/2004 | McClendon .......... | B60P 7/0853 294/104 |
| 7,393,031 B2 | 7/2008 | Goulet | |
| D719,423 S | 12/2014 | Rowe | |
| 8,915,529 B1 | 12/2014 | Bond | |

* cited by examiner

*Primary Examiner* — Paul T Chin (57) ABSTRACT

The tool for the placement of cargo straps and edge protectors is configured for use with a flatbed trailer. The tool for the placement of cargo straps and edge protectors is configured for use with a webbing. The webbing is used to secure cargo to the flatbed trailer. The tool for the placement of cargo straps and edge protectors attaches to the webbing. The tool for the placement of cargo straps and edge protectors is used to position the webbing relative to the cargo such that the once the webbing is tightened the webbing to be tightened secures the cargo to the flatbed trailer. The tool for the placement of cargo straps and edge protectors comprises a telescopic handle, a spatula, and a threaded connection. The threaded connection attaches the spatula to the telescopic handle.

11 Claims, 6 Drawing Sheets

COTTER PIN

FIG. 6

SPRING LOADED
BALL LOCK

FIG. 7

G SNAP COLLAR

FIG. 8

SPLIT COLLAR LOCK

FIG. 9

THREADED CLUTCH

FIG. 10

INTERNAL CAM LOCK

FIG. 11

TOOL FOR PLACEMENT OF CARGO STRAPS AND EDGE PROTECTORS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transporting and vehicles, more specifically, an accessory configured for use with straps used in securing a load.

SUMMARY OF INVENTION

The tool for the placement of cargo straps and edge protectors is configured for use with a flatbed trailer. The tool for the placement of cargo straps and edge protectors is configured for use with a webbing. The webbing is used to secure cargo to the flatbed trailer. The tool for the placement of cargo straps and edge protectors attaches to the webbing. The tool for the placement of cargo straps and edge protectors is used to position the webbing relative to the cargo such that the once the webbing is tightened the webbing to be tightened placement of cargo straps and edge protectors comprises a telescopic handle, a spatula, and a threaded connection. The threaded connection attaches the spatula to the telescopic handle.

These together with additional objects, features and advantages of the tool for the placement of cargo straps and edge protectors will be readily apparent to those of ordinary skill in the art upon reading the following detailed description of the presently preferred, but nonetheless illustrative, embodiments when taken in conjunction with the accompanying drawings.

In this respect, before explaining the current embodiments of the tool for the placement of cargo straps and edge protectors in detail, it is to be understood that the tool for the placement of cargo straps and edge protectors is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the tool for the placement of cargo straps and edge protectors.

It is therefore important that the claims be regarded as depart from the spirit and scope of the tool for the placement of cargo straps and edge protectors. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, theory presented in the preceding technical field, background, brief summary or the following detailed description.

Figure 1:
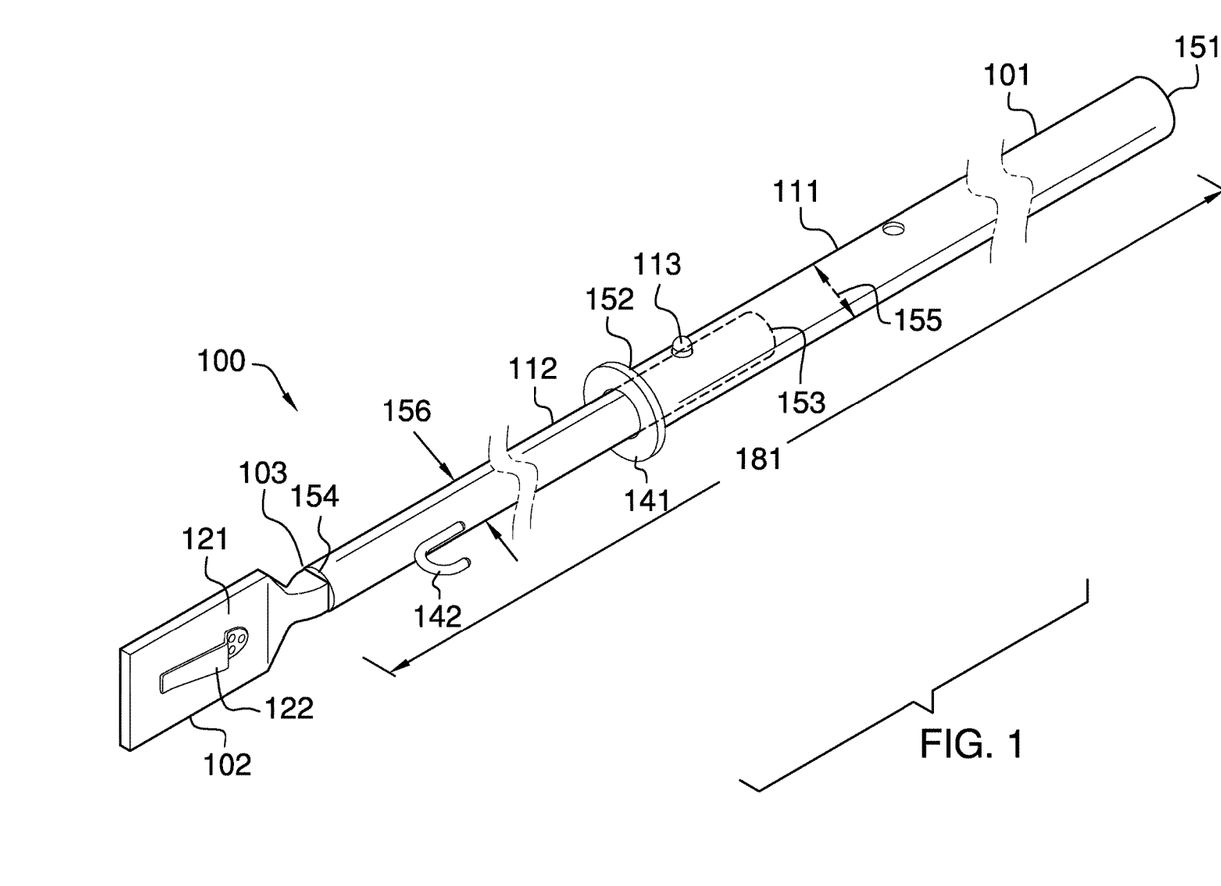
FIG. 1 is a perspective view of an embodiment of the disclosure.
Figure 2:
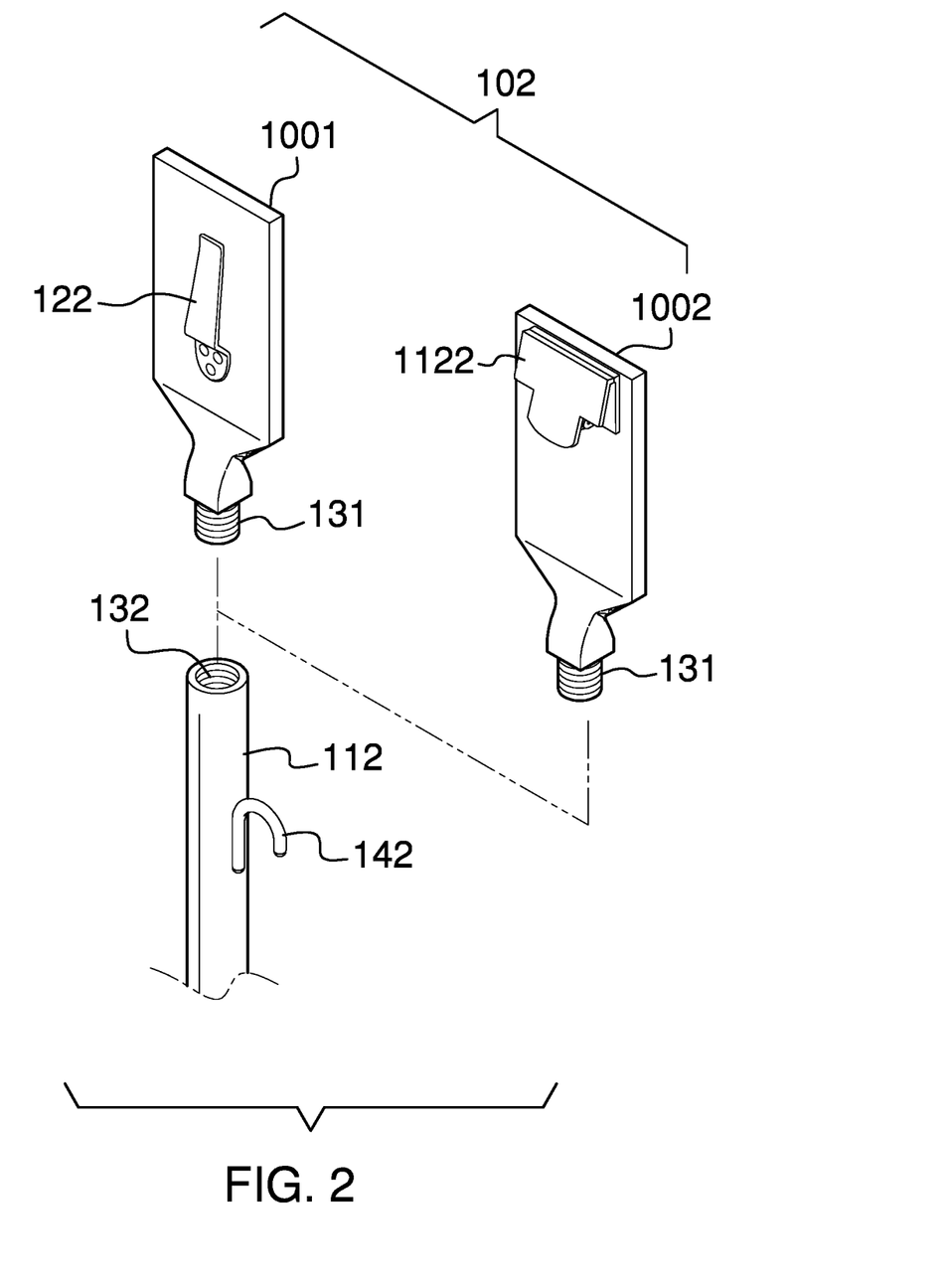
FIG. 2 is an exploded view of an embodiment of the disclosure.
Figure 3:
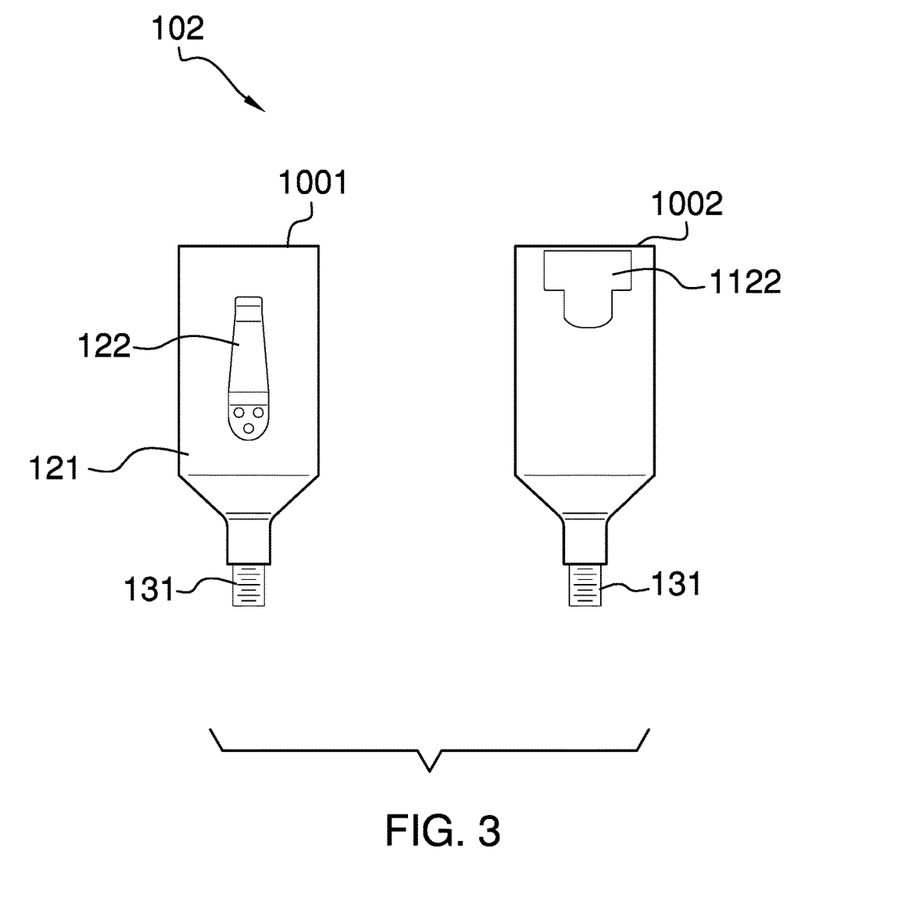
FIG. 3 is a front view of an embodiment of the disclosure.
Figure 4:
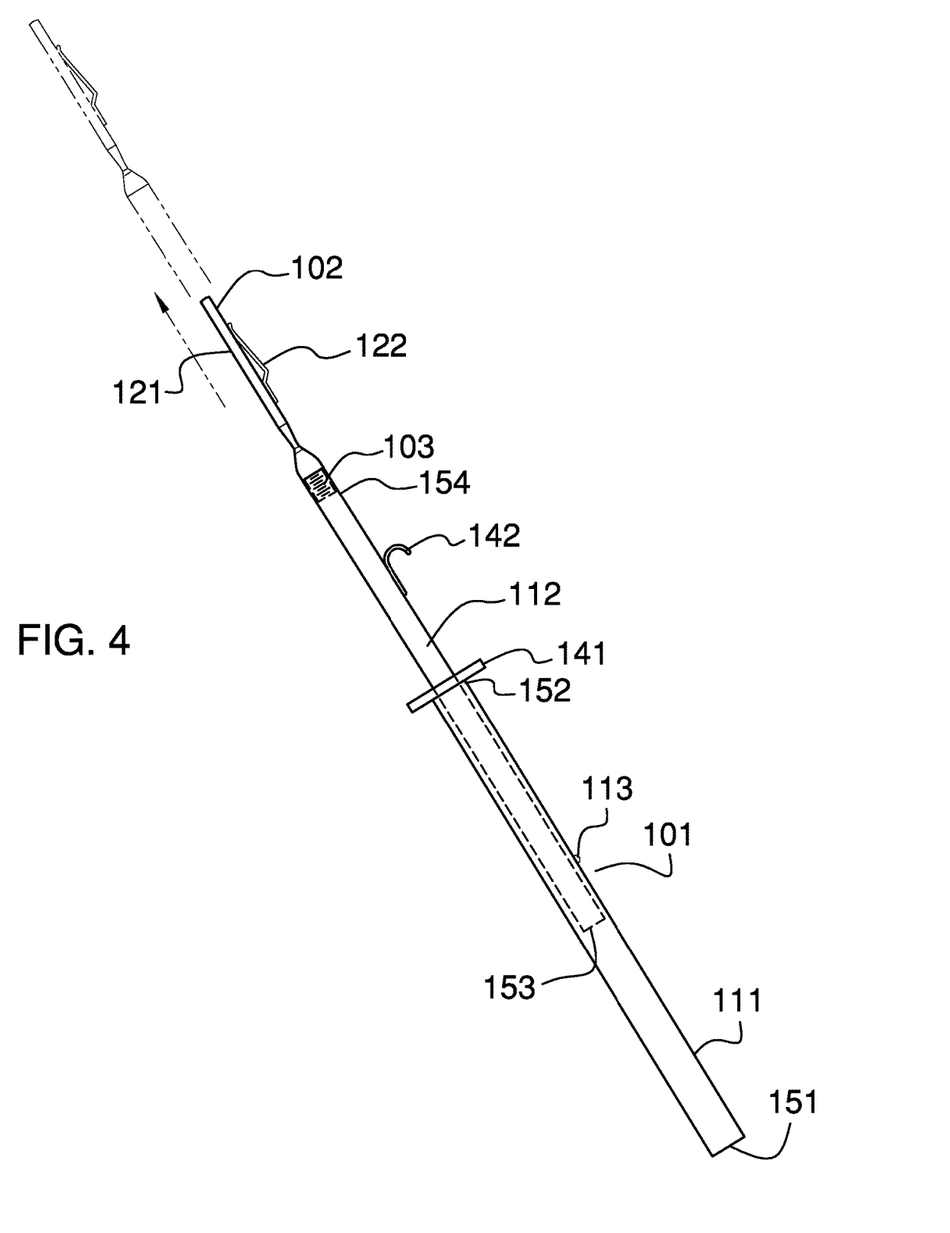
FIG. 4 is a side view of an embodiment of the disclosure.
Figure 5:
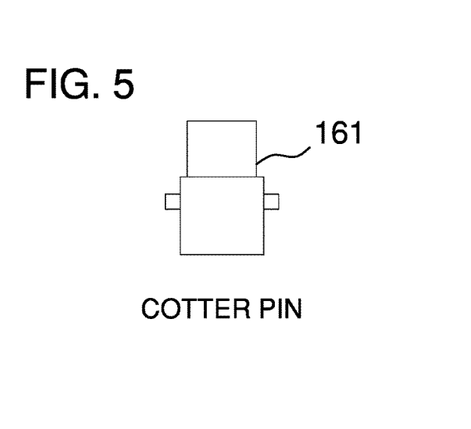
FIG. 5 is a detail view of an embodiment of the disclosure.
Figures 6, 8:
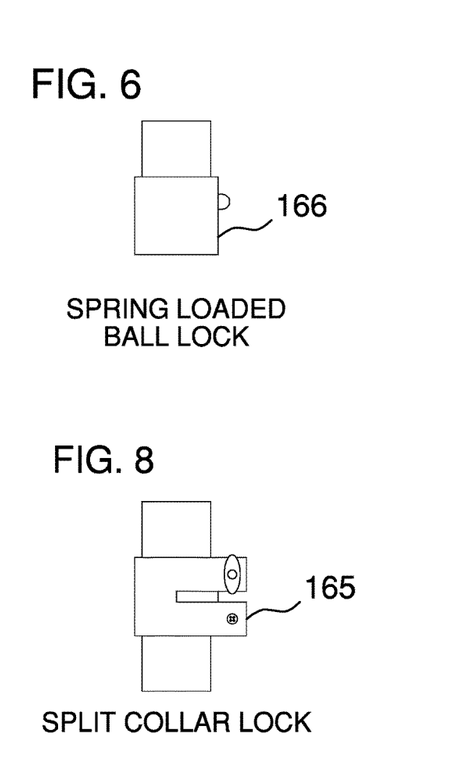
FIG. 6 is a detail view of an embodiment of the disclosure.
FIG. 8 is a detail view of an embodiment of the disclosure.
Figure 7:
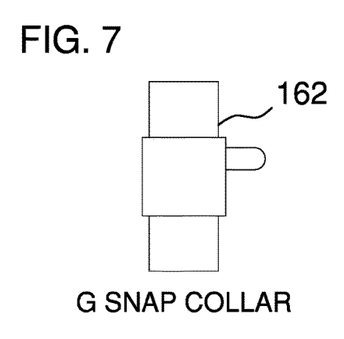
FIG. 7 is a detail view of an embodiment of the disclosure.
Figure 9:
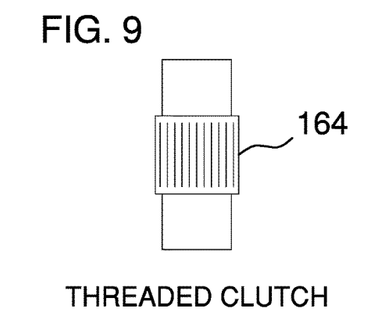
FIG. 9 is a detail view of an embodiment of the disclosure.
Figure 10:
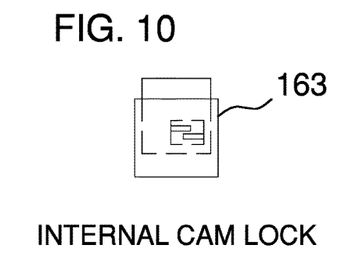
FIG. 10 is a detail view of an embodiment of the disclosure.
Figure 11:
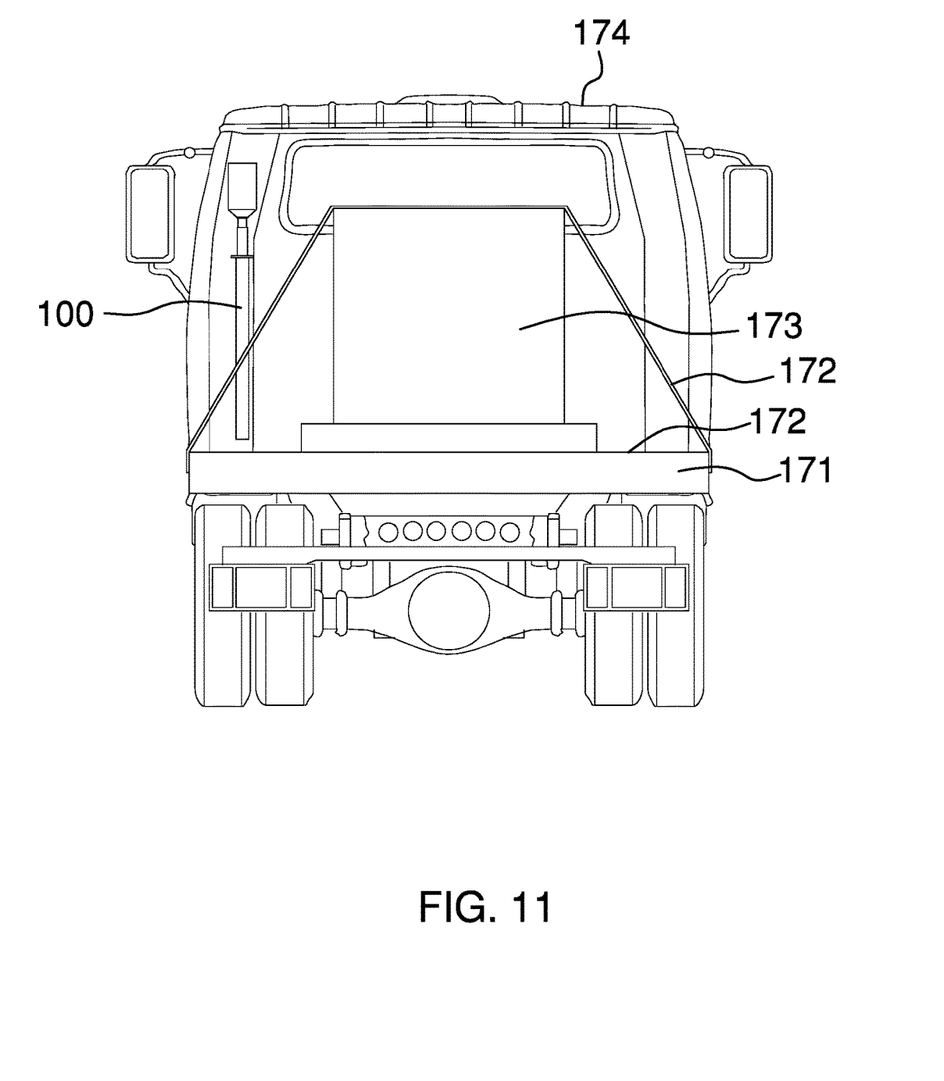
FIG. 11 is an in-use view of an embodiment of the disclosure.

Detailed reference will now be made to one or more potential embodiments of the disclosure, which are illustrated in FIGS. 1 through 11.

The tool for the placement of cargo straps and edge protectors 100 (hereinafter invention) is configured for use with a flatbed trailer 171. The invention 100 is configured for use with a webbing 172. The webbing 172 is used to secure cargo 173 to the flatbed trailer 171. The invention 100 is a spatulated device that attaches to the webbing 172. The invention 100 is used to position the webbing 172 relative to the cargo 173 such that the once the webbing 172 is tightened the webbing 172 secures the cargo 173 to the flatbed trailer 171. The length 181 of the invention 100 is adjustable. The invention 100 comprises a telescopic handle 101, a spatula 102, and a threaded connection 103. The threaded connection 103 attaches the spatula 102 to the telescopic handle 101.

The threaded connection 103 is a well-known fastening method that is used to attach the spatula 102 to the telescopic handle 101. The threaded connection 103 is discussed in greater detail elsewhere in this disclosure. The threaded connection 103 comprises an exterior screw thread 131 and an interior screw structure that is attached to the blade 121. The exterior screw thread 131 is discussed in greater detail elsewhere in this disclosure. The interior screw thread 132 is a helical structure that is formed within the fourth end 154 of the second arm 112. The interior screw thread 132 is discussed in greater detail elsewhere in this disclosure.

The telescopic handle 101 is a wand that is used to extend the reach of the user of the invention 100. The length 181 of the telescopic handle 101 is adjustable. The telescopic handle 101 further comprises a first arm 111, a second arm 112 and a detent 113. The detent 113 connects the second arm 112 to the first arm 111. The first arm 111 is further defined with a first end 151, a second end 152, and an inner diameter 155. The second arm 112 is further defined with a third end 153, a fourth end 154, and an outer diameter 156. The telescopic handle 101 is further defined with a length 181. The length 181 is the span of the distance from the first end 151 of the first arm 111 to the fourth end 154 of the second arm 112.

The first arm 111 is a hollow first structure that is further defined with an inner diameter 155. The second arm 112 is a second structure that is further defined with an outer diameter 156. The outer diameter 156 of the second arm 112 is less than the inner diameter 155 of the first arm 111 such that the second arm 112 can be inserted into the first arm 111 in a telescopic manner. This telescopic arrangement of the telescopic handle 101 allows the length 181 of the telescopic handle 101 to be adjusted by adjusting the relative position of the second arm 112 within the first arm 111. The position of the second arm 112 relative to the first arm 111 is held in position using the detent 113. The detent 113 is a mechanical device that connects and secures the first arm 111 to the second arm 112. As shown most clearly in FIG. 5, the detent 113 is selected from the group consisting of a cotter pin 161, a G snap collar 162, a cam lock collar 163, a threaded clutch 164, a split collar lock 165, or a spring-loaded ball lock 166.

The first arm 111 is a first rigid hollow cylindrical capped tube. The first end 151 of the first arm 111 is the closed end. The first arm 111 further comprises a flange 141. The flange 141 is a flat rim that is formed around the exterior face of the second end 152 of the first arm 111. The flange 141 is formed around the tube opening at the second end 152 of the first arm 111 such that the second arm 112 may be inserted into the second end 152. The purpose of the flange 141 is to prevent the first arm 111 from being inserted into a space within the loaded cargo 173 that is too small for the first arm 111 to fit.

The second arm 112 further comprises a hook 142. The second arm 112 is a rigid hollow cylindrical tube. The hook 142 second arm 112. The hook 142 is used to hang the invention 100 on the back side of the tractor 174 for storage.

The detent 113 is a commercially available fastening device that fixes the position of the second arm 112 relative to the first arm 111 after the length 181 of the telescopic handle 101 has been adjusted and set. The cotter pin 161 is a commercially available fastening device that is used to lock telescopic structures in position. The G snap collar 162 is a commercially available fastening device that is used to lock telescopic structures in position. The cam lock collar 163 is a commercially available fastening device that is used to lock telescopic structures in position. The threaded clutch 164 is a commercially available fastening device that is used to lock telescopic structures in position. The split collar lock 165 is a commercially available fastening device that is used to lock telescopic structures in position. The spring-loaded ball lock 166 is a commercially available fastening device that is used to lock telescopic structures in position.

The spatula 102 is a bladed device to which the webbing 172 is attached. The spatula 102 attaches to the telescopic handle 101. The spatula 102 forms the leading tip of the invention 100 that threads the webbing 172 through or around the cargo 173 as the cargo 173 is being secured to the flatbed trailer 171. The spatula 102 comprises a blade 121 and a clip 122.

The blade 121 is a rectangular plate structure that forms the leading tip of the invention 100. The vertices of the rectangular structure of the blade 121 may be rounded.

The clip 122 attaches the webbing 172 to the blade 121. The clip 122 is a plate shaped flat spring that is attached by one end to the center of the blade 121. The clip 122 acts as a spring. Specifically, when a force is applied perpendicularly to the surface of the clip 122, the elasticity of the clip 122 creates a rotational torque that opposes the displacement created by rotating the clip 122 around a pivot point located where the clip 122 is attached to the blade 121. This rotational torque places a strain on the clip 122 such that the force of the strain is in the direction that returns the clip 122 to its original position. When an object is inserted between the clip 122 and the blade 121, this spring like action produces a clamping force that holds the webbing 172 securely in position against the object.

It shall be noted that the figures depict 2 distinct spatulas 102. The two distinct spatulas 102 of the patent figures provide the same functionality, but can be used for different applications of webbing 172, chains, or edge protectors. The 2 distinct spatulas 102 may be further defined as a first spatula 1001, and a second spatula 1002. The first the second spatula 1002 includes an alligator clip 1122 instead of the clip 122 described above.

The invention 100 is assembled as described in following 2 paragraphs.

The flange 141 attaches to the second end 152 of the first arm 111. The hook 142 attaches to the cylindrical face of the second arm 112. The third end 153 of the second arm 112 is inserted into the second end 152 of the first arm 111 such that the center axes of the first arm 111 and the second arm 112 are aligned. The detent 113 locks the second arm 112 into a fixed position relative to the first arm 111.

The interior screw thread 132 is formed inside the fourth end 154 of the second arm 112. The exterior screw thread 131 attaches to the end of the blade 121 that is proximal to the second arm 112. To form the threaded connection 103 that joins the spatula 102 to the telescopic handle 101, the exterior screw thread 131 of the spatula 102 is screwed into the interior screw thread 132 of the second arm 112 of the telescopic handle 101.

The following definitions were used in this disclosure:

Align: As used in this disclosure, align refers to an arrangement of objects that are: 1) arranged in a straight line; or, 2) arranged to give a directional sense of a plurality of parallel lines.

Blade: As used in this disclosure, a blade is a term that is used to describe: 1) a wide and flat portion of a structure; or, 2) the cutting edge of a tool.

Capped Tube: As used in this disclosure, a capped tube is a tube with one closed end and one open end.

Cargo: As used in this disclosure, cargo refers to one or more objects that are intended to be transported using a vehicle.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or cone like structure. When the center axes of two cylinder or like structures share the same line they are said to be aligned. When the center axes of two cylinder like structures do not share the same line they are said to be offset.

Clip: As used in this disclosure, a clip is a fastener that attaches to an object by gripping or clasping the object.

Cylinder: As used in this disclosure, a cylinder is a geometric structure defined by two identical flat and parallel ends, also commonly referred to as bases, which are circular in shape and connected with a single curved surface, referred to in this disclosure as the face. The cross section of the cylinder remains the same from one end to another. The axis of the cylinder is formed by the straight line that connects the center of each of the two identical flat and parallel ends of the cylinder. Unless otherwise stated within this disclosure, the term cylinder specifically means a right cylinder which is defined as a cylinder wherein the curved surface perpendicularly intersects with the two identical flat and parallel ends.

Detent: As used in this disclosure, a detent is a device for positioning and holding one mechanical part in relation to another in a manner such that the device can be released by force applied to one or more of the parts.

Diameter: As used in this disclosure, a diameter of an object is a straight line segment that passes through the center of an object. The line segment of the diameter is terminated at the perimeter or boundary of the object through which the line segment of the diameter runs.

Exterior Screw Thread: An exterior screw thread is a ridge wrapped around the outer surface of a tube in the form of a helical structure that is used to convert rotational movement into linear movement.

Flange: As used in this disclosure, a flange is a protruding rib, edge, or collar that is used to hold an object in place or to attach a first object to a second object.

Flat Spring: As used in this disclosure, a flat spring is a device designed to store and release mechanical energy that is made of a flat or conical piece of material.

Hook: As used in this disclosure, a hook is an object that is curved or bent at an angle such that items can be hung on or caught by the object.

Inner Diameter: As used in this disclosure, the term inner diameter is used in the same way that a plumber would refer to the inner diameter of a pipe.

Interior Screw Thread: An interior screw thread is a groove that is formed around the inner surface of a tube in the form of a helical structure that is used to convert rotational movement into linear movement.

Outer Diameter: As used in this disclosure, the term outer diameter is used in the same way that a plumber would refer to the outer diameter of a pipe.

Plate: As used in this disclosure, a plate is a smooth, flat and semi-rigid or rigid structure that has at least one dimension that: 1) is of uniform thickness; and 2) that appears thin relative to the other dimensions of the object. Plates often have a rectangular or disk like appearance. As defined in this disclosure, plates may be made of any material, but are commonly made of metal. When made of wood, a plate is often referred to as a board.

Rounded: A used in this disclosure, the term rounded refers to the replacement of an apex or vertex of a structure with a (generally smooth) curvature wherein the concave portion of the curvature faces the interior or center of the structure.

Rounded Rectangle: A used in this disclosure, a rounded rectangle is a rectangle wherein one or more of the corner structures of the rectangle are replaced with a curvature wherein the concave portion of the curvature faces the center of the rounded rectangle.

Spatula: As used in this disclosure, a spatula is a rectangular object that has a flat appearance in one dimension relative to the other two dimensions. The rectangular structure of the spatula may be rounded. The body of the spatula is referred to as the blade or paddle of the spatula. If a surface of the spatula is not confined to a plane, the spatula is said to be offset.

Spatulated: As used in this disclosure, the adjective spatulated is used to describe an object with the general properties of a spatula.

Strap: As used in this disclosure a strap is a strip of leather, cloth, or other flexible material, often with a buckle, that is used to fasten, secure, carry, or hold onto something.

Strip: As used in this disclosure, the term describes a long and narrow object of uniform thickness that appears thin relative to the length of the object. Strips are often rectangular in shape.

Telescopic: As used in this disclosure, telescopic is an adjective that describes an object made of sections that fit or slide into each other such that the object can be made longer or shorter by adjusting the relative positions of the sections.

Textile: As used in this disclosure, a textile is a material that is woven, knitted, braided or felted. Synonyms in common usage for this definition include fabric and cloth.

Threaded Connection: As used in this disclosure, a threaded connection is a type of fastener that is used to join a first tube shaped and a second tube shaped object together. The first tube shaped object is fitted with fitted with a first fitting selected from an interior screw thread or an exterior screw thread. The second tube shaped object is fitted with the remaining screw thread. The tube shaped object fitted with the exterior screw thread is placed into the remaining tube shaped object such that: 1) the interior screw thread and the exterior screw thread interconnect; and, 2) when the tube shaped object fitted with the exterior screw thread is rotated the rotational motion is converted into linear motion that moves the tube shaped object fitted with the exterior screw thread either into or out of the remaining tube shaped object. The direction of linear motion is determined by the direction of rotation.

Tractor: As used in this disclosure, a tractor is a vehicle having a cab, no body and a powerful diesel or gasoline powered engine that is used to pull one or more trailers.

Trailer: As used in this disclosure, a trailer is an unpowered wheeled vehicle that is towed by a powered vehicle.

Tube: As used in this disclosure, a tube is a hollow cylindrical device that is used for transporting liquids and gases. The line that connects the center of the first base of the cylinder to the center of the second base of the cylinder is referred to as the center axis of the tube or the centerline of the tube. In this disclosure, the terms inner diameter of a tube and outer diameter of a tube are used as they would be used by those skilled in the plumbing arts.

Vertex: As used in this disclosure, a vertex (plural vertices) is an angle that is formed by two lines that form a point. Vertices are commonly found in polygons.

Webbing: As used in this disclosure, a webbing is strong, close woven or knitted fabric that is used for straps or belting. As used in this disclosure, webbing is a fully formed material that is only cut to length for use. Webbing is not formed by cutting broader materials into strips.

With respect to the above description, it is to be realized that the optimum dimensional relationship for the various components of the invention described above and in FIGS. 1 through 11 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A placement tool comprising:
   wherein the placement tool comprises a telescopic handle, a spatula, and a threaded connection;
   wherein the threaded connection attaches the spatula to the telescopic handle;
   wherein the placement tool is further defined with a length;
   wherein the placement tool is configured for use with a flatbed trailer;
   wherein the placement tool is configured for use with a webbing;
   wherein the webbing is used to secure cargo to the flatbed trailer;
   wherein the placement tool attaches to the webbing;
   wherein the placement tool positions the webbing relative to the cargo such that the once the webbing is tightened the webbing secures the cargo to the flatbed trailer;
   wherein the span of the placement tool is adjustable;
   wherein the threaded connection is a fastening apparatus;
   wherein the threaded connection comprises an exterior screw thread and an interior screw thread;
   wherein the exterior screw thread is a helical structure that is attached to the blade;
   wherein the interior screw thread is a helical structure that is formed within the telescopic handle;
   wherein the interior screw thread is discussed in greater detail elsewhere in this disclosure;
   wherein the telescopic handle is a wand that is used to extend the reach of the user of the placement tool;
   wherein the telescopic handle further comprises a first arm, a second arm and a detent;
   wherein the detent connects the second arm to the first arm;
   wherein the first arm is further defined with a first end and a second end;
   wherein the second arm is further defined with a third end and a fourth end;
   wherein the telescopic handle is further defined with a length;
   wherein the length of the telescopic handle is adjustable;
   wherein the length is the span of the distance from the first end of the first arm to the fourth end of the second arm;
   wherein the first arm is a hollow first structure that is further defined with an inner diameter;
   wherein the second arm is a second structure that is further defined with an outer diameter;
   wherein the outer diameter of the second arm is less than the inner diameter of the first arm such that the second arm can be inserted into the first arm in a telescopic manner;
   wherein the length of the telescopic handle is adjusted by adjusting the relative position of the second arm within the first arm;
   wherein the detent is a mechanical device;
   wherein the detent connects and secures the first arm to the second arm;
   wherein the detent is selected from the group consisting of a cotter pin, a G snap collar, a cam lock collar, a threaded clutch, a split collar lock, or a spring-loaded ball lock;
   wherein the first arm is a first rigid hollow cylindrical capped tube;
   wherein the first end of the first arm is the closed end;
   wherein the first arm further comprises a flange;
   wherein the flange is a flat rim that is formed around the exterior face of the first arm;
   wherein the flange is formed such that the second arm may be inserted into the first arm;
   wherein the second arm is a rigid hollow cylindrical tube;
   wherein the second arm further comprises a hook;
   wherein the hook is a curved device.

2. The placement tool according to claim 1
   wherein the spatula is a bladed device to which the webbing is attached;
   wherein the spatula forms the leading tip of the placement tool that threads the webbing through or around the cargo as the cargo is being secured to the flatbed trailer.

3. The placement tool according to claim 2
   wherein the spatula comprises a blade and a clip;
   wherein the clip attaches to the blade.

4. The placement tool according to claim 3 wherein the blade is a plate structure that forms the leading tip of the placement tool.

5. The placement tool according to claim 4 wherein the clip attaches the webbing to the blade.

6. The placement tool according to claim 5
   wherein the clip is a flat spring;
   wherein the clip is attached by one end to blade;
   wherein when a force is applied perpendicularly to the surface of the clip the elasticity of the clip creates a rotational torque;
   wherein this rotational torque places a strain on the clip such that the force of the strain is in the direction that returns the clip to its original position;
   wherein when an object is inserted between the clip and the blade the strain on the clip produces a clamping force that holds the webbing securely in position against the object.

7. The placement tool according to claim 6
   wherein the flange attaches to the second end of the first arm;
   wherein the hook attaches to the cylindrical face of the second arm.

8. The placement tool according to claim 7 wherein the third end of the second arm is inserted into the second end of the first arm such that the center axes of the first arm and the second arm are aligned.

9. The placement tool according to claim 8
   wherein the interior screw thread is formed inside the fourth end of the second arm;
   wherein the exterior screw thread attaches to the end of the blade that is proximal to the second arm.

10. The placement tool according to claim 9 wherein to form the threaded connection that joins the spatula to the telescopic handle, the exterior screw thread of the spatula is screwed into the interior screw thread of the second arm of the telescopic handle.

11. The placement tool according to claim 10 wherein the detent is a spring-loaded ball lock.

* * * * *